United States Patent
Nachenberg et al.

(10) Patent No.: US 7,373,519 B1
(45) Date of Patent: May 13, 2008

(54) DISTINGUISHING LEGITIMATE MODIFICATIONS FROM MALICIOUS MODIFICATIONS DURING EXECUTABLE COMPUTER FILE MODIFICATION ANALYSIS

(75) Inventors: Carey Nachenberg, Northridge, CA (US); Frederic Perriot, Santa Monica, CA (US)

(73) Assignee: Symantec Corporation, Cupertino, CA (US)

( * ) Notice: Subject to any disclaimer, the term of this patent is extended or adjusted under 35 U.S.C. 154(b) by 696 days.

(21) Appl. No.: 10/411,572

(22) Filed: Apr. 9, 2003

(51) Int. Cl.
*G06F 11/30* (2006.01)
*G06F 12/14* (2006.01)
*H04L 9/32* (2006.01)

(52) U.S. Cl. .................. 713/187; 726/22; 726/26; 380/46; 713/188; 713/189

(58) Field of Classification Search ............ 714/38; 713/187–188; 726/23–26, 22
See application file for complete search history.

(56) References Cited

U.S. PATENT DOCUMENTS

| | | |
|---|---|---|
| 3,969,723 A | 7/1976 | Kennicott |
| 4,558,413 A | 12/1985 | Schmidt et al. |
| 4,714,992 A | 12/1987 | Gladney et al. |
| 4,809,170 A | 2/1989 | Leblang et al. |
| 4,962,532 A | 10/1990 | Kasiraj et al. |
| 5,155,847 A | 10/1992 | Kirouac et al. |
| 5,182,806 A | 1/1993 | McKeeman et al. |
| 5,204,960 A | 4/1993 | Smith et al. |
| 5,377,354 A | 12/1994 | Scannell et al. |
| 5,414,833 A * | 5/1995 | Hershey et al. .......... 726/22 |
| 5,448,045 A * | 9/1995 | Clark .................... 235/382 |
| 5,479,654 A | 12/1995 | Squibb |
| 5,485,575 A | 1/1996 | Chess et al. |
| 5,495,610 A | 2/1996 | Shing et al. |
| 5,508,817 A | 4/1996 | Kunigami |
| 5,519,866 A | 5/1996 | Lawrence et al. |
| 5,555,346 A | 9/1996 | Gross et al. |
| 5,557,723 A | 9/1996 | Holt et al. |
| 5,566,335 A | 10/1996 | Nash et al. |
| 5,572,590 A * | 11/1996 | Chess ..................... 726/22 |

(Continued)

FOREIGN PATENT DOCUMENTS

EP 0230616 A2 8/1987

(Continued)

OTHER PUBLICATIONS

Jee, et al., "A Generic Virus Detection Agent on the Internet", pp. 210-219, 1997 IEEE, retrieved May 10, 2006, Taiwan.

(Continued)

*Primary Examiner*—Kambiz Zand
*Assistant Examiner*—Jason K. Gee
(74) *Attorney, Agent, or Firm*—Fenwick & West LLP (57) ABSTRACT

Prior to a modification of an executable computer file (101), a modification analysis manager (111) stores (1101) content concerning a specified number of specified sized blocks (115) of a specified section of the executable file (101). After the modification of the executable file (101), the modification analysis manager (111) compares (1103), for each block (115), the content at the location of the block (115) after the modification of the executable file (101) with the content of the block (115) prior to the modification. The modification analysis manager (101) determines (1105) the status of the modification, responsive to a result of the comparison.

24 Claims, 11 Drawing Sheets

U.S. PATENT DOCUMENTS

| | | | |
|---|---|---|---|
| 5,574,906 | A | 11/1996 | Morris |
| 5,581,764 | A | 12/1996 | Fitzgerald et al. |
| 5,613,108 | A | 3/1997 | Morikawa |
| 5,619,648 | A | 4/1997 | Canale et al. |
| 5,649,200 | A | 7/1997 | Leblang et al. |
| 5,671,398 | A | 9/1997 | Neubauer |
| 5,673,387 | A | 9/1997 | Chen et al. |
| 5,684,875 | A | 11/1997 | Ellenberger |
| 5,694,616 | A | 12/1997 | Johnson et al. |
| 5,699,275 | A | 12/1997 | Beasley et al. |
| 5,717,923 | A | 2/1998 | Dedrick |
| 5,729,743 | A | 3/1998 | Squibb |
| 5,774,552 | A | 6/1998 | Grimmer |
| 5,781,901 | A | 7/1998 | Kuzma |
| 5,790,856 | A | 8/1998 | Lillich |
| 5,794,210 | A | 8/1998 | Goldhaber et al. |
| 5,799,189 | A | 8/1998 | Koser et al. |
| 5,832,220 | A | 11/1998 | Johnson et al. |
| 5,892,900 | A | 4/1999 | Ginter et al. |
| 5,893,113 | A | 4/1999 | McGrath et al. |
| 5,903,880 | A | 5/1999 | Biffar |
| 5,905,896 | A | 5/1999 | Delannoy |
| 5,909,581 | A | 6/1999 | Park |
| 5,911,048 | A | 6/1999 | Graf |
| 5,917,489 | A | 6/1999 | Thurlow et al. |
| 5,933,647 | A | 8/1999 | Aronberg et al. |
| 5,933,811 | A | 8/1999 | Angles et al. |
| 5,948,058 | A | 9/1999 | Kudoh et al. |
| 5,948,104 | A | 9/1999 | Gluck et al. |
| 5,953,532 | A | 9/1999 | Lochbaum |
| 5,960,204 | A | 9/1999 | Yinger et al. |
| 5,960,411 | A | 9/1999 | Hartman et al. |
| 5,999,967 | A | 12/1999 | Sundsted |
| 6,006,034 | A | 12/1999 | Heath et al. |
| 6,035,423 | A | 3/2000 | Hodges et al. |
| 6,052,531 | A | 4/2000 | Waldin et al. |
| 6,057,841 | A | 5/2000 | Thurlow et al. |
| 6,073,142 | A | 6/2000 | Geiger et al. |
| 6,081,814 | A | 6/2000 | Mangat et al. |
| 6,088,803 | A | 7/2000 | Tso et al. |
| 6,092,080 | A | 7/2000 | Gustman |
| 6,119,165 | A | 9/2000 | Li et al. |
| 6,134,658 | A | 10/2000 | Multerer et al. |
| 6,138,146 | A | 10/2000 | Moon et al. |
| 6,145,079 | A | 11/2000 | Mitty et al. |
| 6,146,026 | A | 11/2000 | Ushiku |
| 6,147,977 | A | 11/2000 | Thro et al. |
| 6,151,643 | A | 11/2000 | Cheng et al. |
| 6,161,130 | A | 12/2000 | Horvitz et al. |
| 6,161,181 | A | 12/2000 | Haynes et al. |
| 6,178,551 | B1 | 1/2001 | Sana et al. |
| 6,185,603 | B1 | 2/2001 | Henderson et al. |
| 6,199,081 | B1 | 3/2001 | Meyerzon et al. |
| 6,260,059 | B1 | 7/2001 | Ueno et al. |
| 6,345,256 | B1 | 2/2002 | Milsted et al. |
| 6,349,407 | B1 | 2/2002 | Towfiq |
| 6,363,415 | B1 | 3/2002 | Finney et al. |
| 6,374,237 | B1 | 4/2002 | Reese |
| 6,418,555 | B2 | 7/2002 | Mohammed |
| 6,421,669 | B1 | 7/2002 | Gilmour et al. |
| 6,460,036 | B1 | 10/2002 | Herz |
| 6,460,050 | B1 | 10/2002 | Pace et al. |
| 6,484,315 | B1 | 11/2002 | Ziese |
| 6,490,587 | B2 | 12/2002 | Easty et al. |
| 6,493,722 | B1 | 12/2002 | Daleen et al. |
| 6,510,552 | B1 | 1/2003 | Benayoun et al. |
| 6,535,894 | B1 | 3/2003 | Schmidt et al. |
| 6,609,196 | B1 | 8/2003 | Dickinson et al. |
| 6,651,249 | B2 | 11/2003 | Waldin et al. |
| 6,654,787 | B1 | 11/2003 | Aronson et al. |
| 6,771,765 | B1 | 8/2004 | Crowther et al. |
| 2001/0018739 | A1 | 8/2001 | Anderson et al. |
| 2002/0007400 | A1 | 1/2002 | Pederson |
| 2002/0069363 | A1* | 6/2002 | Winburn ............... 713/200 |
| 2002/0164020 | A1* | 11/2002 | Mustafa ............... 380/46 |
| 2002/0178375 | A1* | 11/2002 | Whittaker et al. ......... 713/200 |
| 2004/0133776 | A1 | 7/2004 | Putzolu |

FOREIGN PATENT DOCUMENTS

| | | |
|---|---|---|
| EP | 0735474 A2 | 10/1996 |
| EP | 0774720 A2 | 5/1997 |
| WO | WO 96/32679 A1 | 10/1996 |
| WO | WO 99/22325 A1 | 5/1999 |
| WO | WO 00/29945 A1 | 5/2000 |
| WO | WO 01/37124 A1 | 5/2001 |

OTHER PUBLICATIONS

Bellare et al., "Incremental Cryptography and Application to Virus Protection", pp. 45-56, 1995 ACM, retrieved May 10, 2006, New York, NY.

"User-Friendly Interface for Applying Specific Levels of Coordinated Updates to Software in the Field," IBM Technical Disclosure Bulletin, vol. 31, No. 10, Mar. 1989, Armonk, NY, U.S.A.

Ambriola, Vincenzo; Bendix, Lars; and Ciancarini, Paolo, "The Evolution of Configuration Management and Version Control," Software Engineering Journal, Nov. 1990, pp. 303-310, retrieved from IEEE database, Sep. 24, 2002, U.S.A.

Conradi, Reidar and Westfechtel, Bernhard, "Configuring Versioned Software Products," Department of CS and Telematics, Norwegian Institute of Technology, Trondhiem, Norway, 1996, retrieved from http://citeseer.nj.nec.com/conradi96 on Sep. 24, 2002.

Grundy, et al., "Support For Collaborative, Integrated Software Development," Proc 95 Software Engineering Environments, Abstract Only, Apr. 1995, U.S.A.

Hedin, Gorel, "Incremental Execution In A Programming Environment Based On Compilation," Proc. Of Nineteenth Hawaii Intl. Conf. On System Sciences, Abstract Only, Jan. 1986, U.S.A.

Hurwitz Group, "Application Management for Distributed Applications," pp. 1-7, Jun. 1998, U.S.A.

Lindsay, Peter; Liu, Yaowei, and Traynor, Owen, "A Generic Model for Fine Grained Configuration Management Including Version Control and Traceability," 1997 IEEE, retrieved from the IEEE database Sep. 24, 2002, U.S.A.

Marimba, "Castanet 3.0 Product Family," Jun. 1998, U.S.A.
Marimba, "Castanet Infrastructure Suite," Jun. 1998, U.S.A.
Marimba, "Castanet Management Suite," Jun. 1988, U.S.A.
Marimba, "Castanet Production Suite," Jun. 1998, U.S.A.

Pocket Soft, ".RTPatch® Professional for Windows, NT, and DOS Binary Update System," pp. 1-6. Jun. 23, 1998, http://www.pocketsoft.com\whtwind.html, U.S.A.

Pollock, Lori, "Incremental Version of Iterative Data Flow Analysis," IEEE Trans Software Eng., v 15, n 12, Abstract Only, Dec. 1989, U.S.A.

Reichenberger, Christoph, "Orthogonal Version Management," Universitat Linz, Institute fur Informatik, Austria, 1989 ACM.

Suk Oh, AM, et al. "An Incremental Update Propagation Scheme For A Cooperative Transaction Model," Proc. 7th Intl. Workshop On Database And Expert Systems Appl, Abstract Only, Sep. 1996, U.S.A.

Keneipp, Ray, Traffic Shaping [Online], May 14, 2001, [retrieved from the Internet on Apr. 27, 2004] Retrieved from the Internet: <URL: Itworld.com—supersite manager—Traffic Shaping http://www.itworld.com/nl/sup_mgr/05142001/>.

ISP-Planet Staff, Slower Spam Would Annoy Spammers [Online] Feb. 20, 2003, [retrieved from the Internet on Apr. 22, 2005]. Retrieved from the Internet: <URL: ISP-Planet—Equipment—Slower Spam Would Annoy Spammers, http://www.isp-planet.com/equipment/2003/spamsquelcher.html>.

Wagner, Mitch, "Tool Users Network Analysis to Fight Spam" [Online] retrieved from the Internet on Apr. 22, 2005] Retreived from the Internet: <URL: Internet Week>E-mail>Tool Uses Network Analysis to Fight Spam> Feb. 13, 2003, http://www.internetweek.com/story/showarticle.jhtml?articleID=6900032>.

PR Newswire, "Spam Squelcher Technology Cuts Costly Impact of Spam on Enterprises and ISPs;" New Product from ePrivcacy Group turns back Spam Attacks with False.
Positives, [Online] Feb. 11, 2003, [Retrieved from the Internet on May 3, 2004]. Retrieved from the Internet:<URL:PR Newswire Spam Squelcher Technology Cuts Costly Impact of Spam on Enterprises and ISPs http://www.findarticles.com/cf_dls/m4prn/2003_Feb_11/97463210/p1/article.jhtml>.

"System File Protection and Windows Me", [online], last updated Dec. 4, 2001, [retrieved on Apr. 9, 2002]. Retrieved from the Internet: <URL: http://www.Microsoft.com/hwdev/archive/sfp/WinME_sfpP.asp.

"Description of the Windows 2000 Windows File Protection Feature (Q222193)", [online], first published May 26, 1999, last modified Jan. 12, 2002, [retrieved on Apr. 9, 2002]. Retrieved from the Internet: 21 URL: http://support.microsoft.com/default.aspx?scid=kb;EN-US;q222193.

"Software: Windows ME; Windows ME and System File Protection", [online], last updated Mar. 11, 2002, [retrieved on Apr. 9, 2002]. Retrieved from the Internet: <URL: http://www.wackyb.co.nz/mesfp.html.

Pending United States patent application entitled "Heuristic Detection Of Computer Viruses," U.S. Appl. No. 10/211,827, filed Aug. 2, 2002.

* cited by examiner

(12) United States Patent
US 7,373,519 B1

DISTINGUISHING LEGITIMATE MODIFICATIONS FROM MALICIOUS MODIFICATIONS DURING EXECUTABLE COMPUTER FILE MODIFICATION ANALYSIS

TECHNICAL FIELD

This invention pertains to accurately detecting the infection of executable computer files by malicious code.

BACKGROUND ART

Computers are vulnerable to malicious computer code such as worms, viruses and Trojan horses. As used herein, "malicious computer code" is any code that enters a computer without an authorized user's knowledge and/or without an authorized user's consent. Malicious computer code can infect a computer by modifying an executable file, such that when the executable file is run, the malicious code executes on the computer. It is possible to analyze an executable file both before and after it is modified, in order to attempt to identify a malicious modification. However, there are many legitimate reasons why an executable file can be modified. It is often difficult to determine whether a modification is legitimate or malicious, as the differences between the two are often subtle. It is therefore desirable to be able to distinguish between a legitimate modification and a malicious modification to an executable file.

Legitimate modifications and malicious modifications do each tend to have certain characteristics. For example, most legitimate modifications insert new code somewhere in the code section of the executable file, thereby adding additional code and shifting the unchanged code to accommodate the modification. Malicious modifications rarely involve such substantive reworkings of the code section. Instead, a malicious modification will often simply append malicious code to the end of the file, and then replace a single instruction in the code section (or header) with an instruction to transfer execution to the appended malicious code. Additionally, legitimate modifications frequently substantively alter the data section of the executable file, whereas malicious modifications rarely do so. Finally, malicious modifications often include specific modifications to the executable file, such as modifying an entry point to transfer control to another location, appending content to the executable file (e.g., to the end of the data section) or altering the flags to extend execute privileges to the data section, so as to be able to execute the maliciously appended content. It would be desirable to utilize these legitimate and malicious modification characteristics to distinguish between a legitimate modification and a malicious modification to an executable file.

DISCLOSURE OF INVENTION

The present invention comprises methods, systems, and computer readable media for distinguishing between a legitimate modification and a malicious modification of an executable computer file (101). In some embodiments, prior to a modification of an executable file (101), a modification analysis manager (111) stores (1101) content information concerning a specified number of specified sized blocks (115) of a specified section of the executable file (101). After the modification of the executable file (101), the modification analysis manager (111) compares (1103), for each block (115), the content at the location of the block (115) after the modification of the executable file (101) with the content of the block (115) prior to the modification of the executable file (101). The modification analysis manager (101) determines (1105) a status of the modification of the executable file (101) responsive to a result of the comparison.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
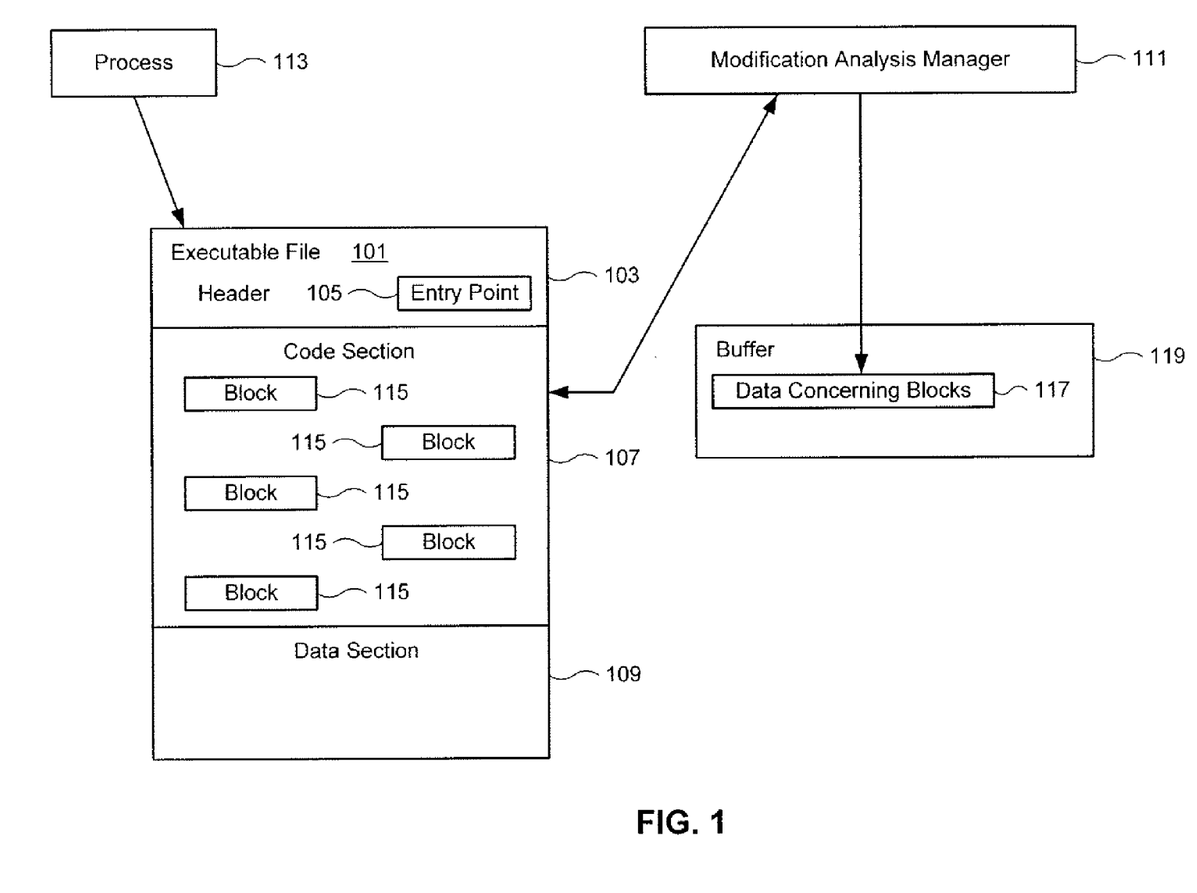
FIG. 1 is a block diagram illustrating a high level overview of one embodiment of the present invention.

FIG. 1 is a block diagram illustrating a high level overview of one embodiment of the present invention. An executable file 101 has a header 103 with an entry point 105, a code section 107 and a data section 109. FIG. 1 illustrates an executable file 101 with an entry point 105 in the header 103. Those of ordinary skill in the relevant art will readily recognize that an entry point 105 can instead be in the code section 107.

A modification analysis manager 111 examines the code section 107 of the executable file 101 before and after a process 113 modifies the executable file 101. Although in the embodiment illustrated by FIG. 1 the modification analysis manager 111 examines the code section 107 in order to distinguish between a legitimate and malicious modification, it is to be understood that in other embodiments other sections are examined, as described later in this specification.

Prior to the process 113 modifying the executable file 101, the modification analysis manager 111 reads the code section 107 and identifies a specified number of specified sized blocks 115 of contiguous substantive content therein. By block 115 of contiguous substantive content it is meant a block 115 of contiguous bytes which do not primarily comprise filler, such as zeros, FFs or nop bytes. Blocks 115 of substantive content from the code section 107 of an executable file 101 will often be modified in characteristic ways by a legitimate modification. Therefore, by examining such blocks 115 before and after a modification of the executable file 101, the modification analysis manager can determine whether a modification is likely legitimate or malicious, as explained in more detail below. It will be readily apparent to one of ordinary skill in the relevant art that varying amounts of filler material, from none to a specified percentage, can be tolerated in a block 115 as desired. The block 115 size to use, and the number of blocks to identify, are also design choices.

In some embodiments, the modification analysis manager 111 identifies the blocks 115 by scanning the code section from end to beginning, looking for specified sized blocks 115 of contiguous substantive content.

For each identified block 115, the modification analysis manager 111 stores data 117 concerning the block 115, for example in a buffer 119 as illustrated. The stored data 117 generally comprises at least the location of the block 115 and content-specific information concerning the block 115. In some embodiments, the location of the block 115 comprises an offset from the beginning of the code section 107. In some embodiments, the modification analysis manager 111 computes a hash value of the block 115, and stores the hash value. In other embodiments, the modification analysis manager 111 stores the actual content of the block 115.

After the modification of the executable file 101, the modification analysis manager 111 compares, for each identified block 115, the content at the location of the block 115 after the modification of the executable file 101 with the content of the block 115 prior to the modification of the executable file 101. Recall that in some embodiments the modification analysis manager 111 computes a hash value of the block 115, and stores the hash value. In those embodiments, the modification analysis manager 111 computes a hash value of the content at the location of the block 115 after the modification of the executable file 101, and compares the hash value of the content at the location of the block 115 after the modification of the executable file 111 with the stored hash value of the content of the block 115 prior to the modification of the executable file 101. In those embodiments in which the modification analysis manager 111 stores the actual content of the block 115, the modification analysis manager 111 compares the actual content at the location of the block 115 after the modification of the executable file 111 with the stored content of the block 115.

Figure 2:
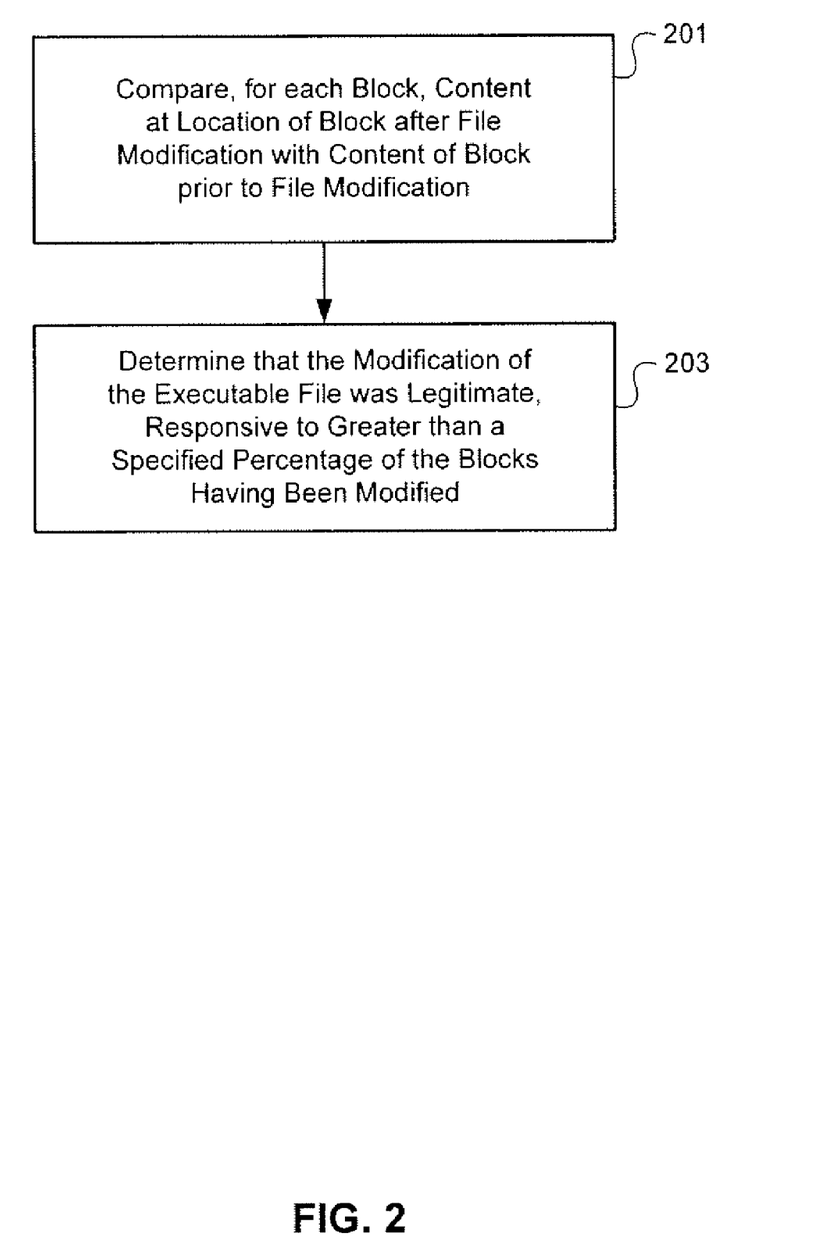
FIG. 2 is a flowchart illustrating steps for determining the status of a modification, according to one embodiment of the present invention.
Figure 3:
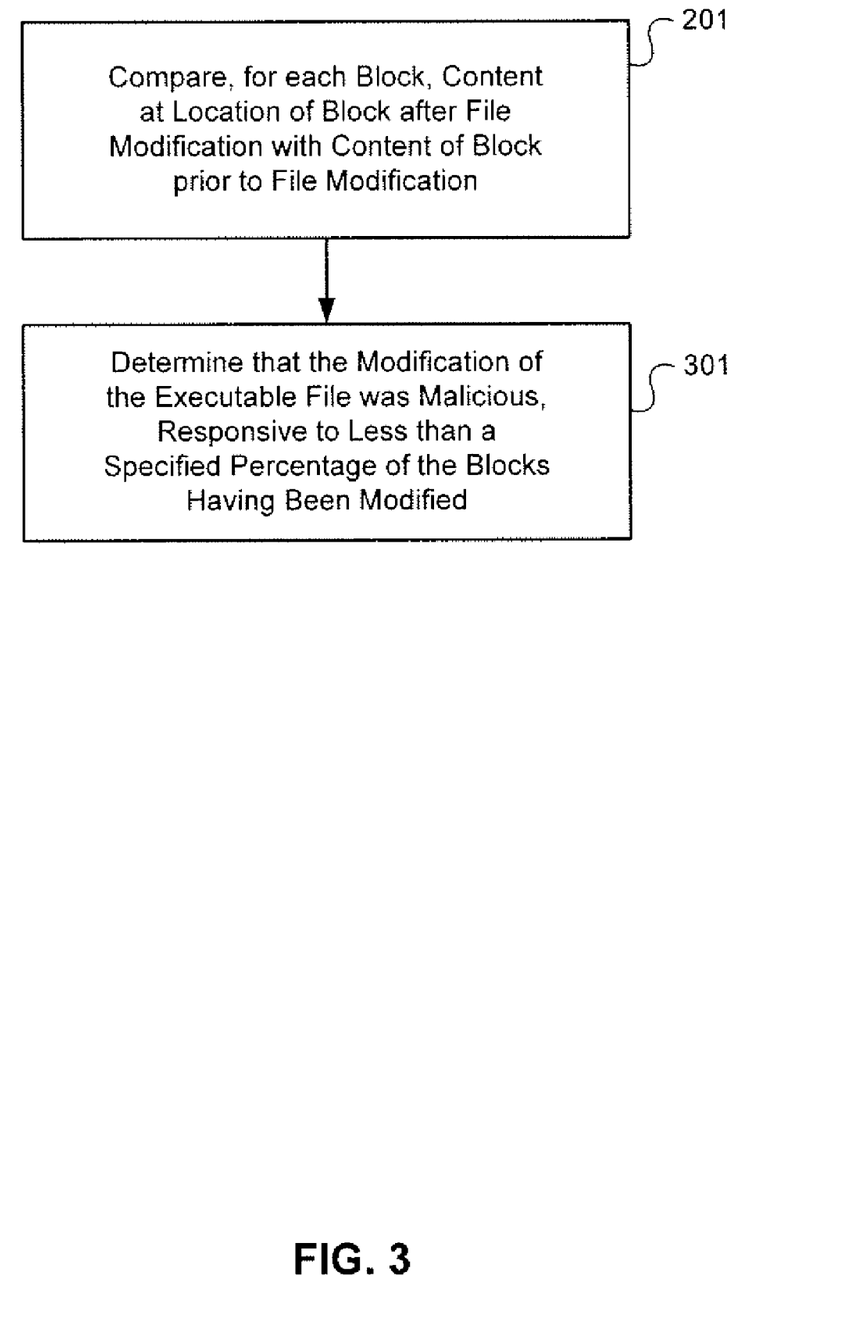
FIG. 3 is a flowchart illustrating steps for determining the status of a modification, according to another embodiment of the present invention.
Figure 4:
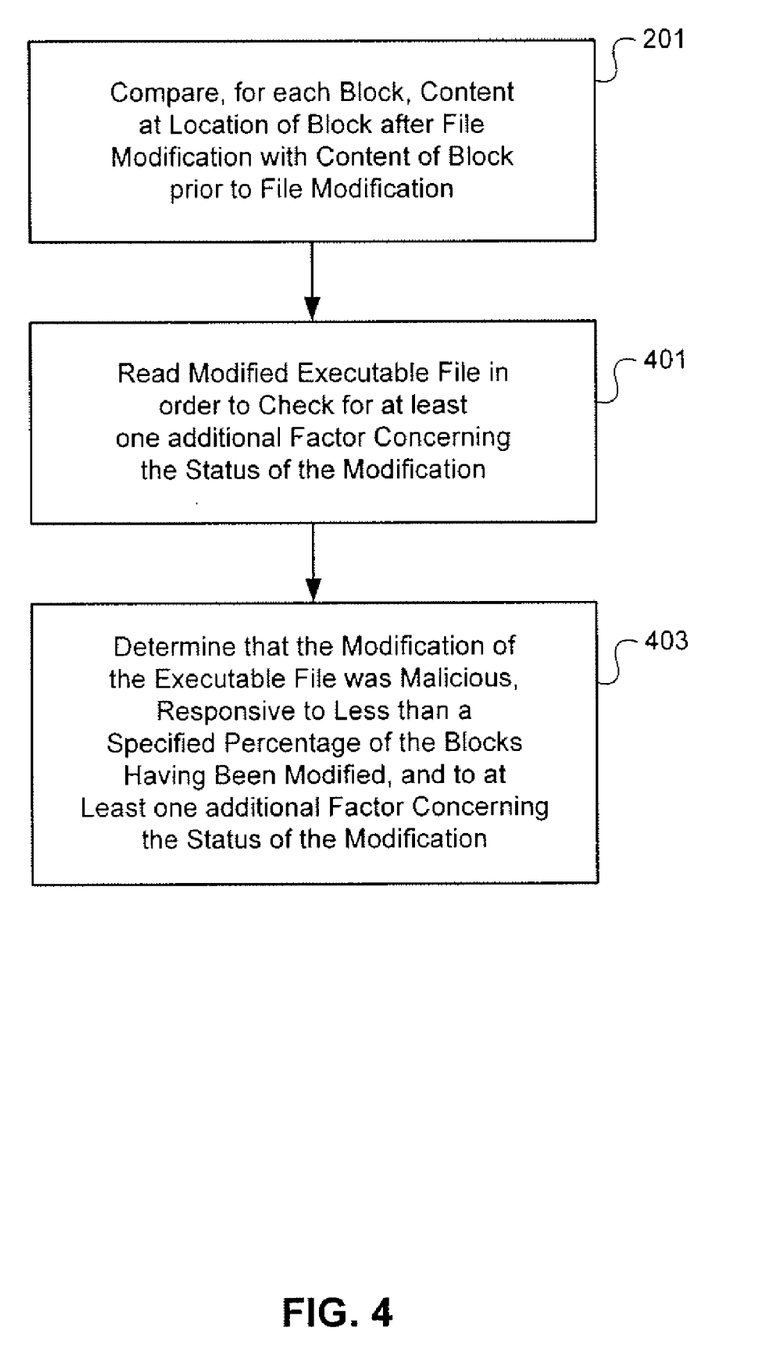
FIG. 4 is a flowchart illustrating steps for determining the status of a modification, according to yet another embodiment of the present invention.

The modification analysis manager 111 proceeds to utilize characteristics of legitimate and/or malicious modifications to determine whether the modification was legitimate or malicious based on the results of the comparison. FIGS. 2-4 illustrate steps for determining the status of a modification, according to various embodiments of the present invention. As illustrated by FIG. 2, in one embodiment the modification analysis manager 111 compares 201, for each identified block 115, content at the location of the block 115 after the executable file 101 has been modified with the content of the block 115 prior to the modification. Responsive to greater than a specified percentage of the blocks 115 having been modified, the modification analysis manager 111 determines 203 that the modification was legitimate. Recall that legitimate modifications typically cause a shifting of content within the code section 107, whereas a malicious modification will typically only overwrite a small portion of the code section 107. Therefore, by determining that a threshold percentage of the identified blocks 115 within the code section 107 have been modified, the modification analysis manager 111 can determine 203 that the modification was legitimate. It will be readily apparent to those of ordinary skill in the art that the exact percentage is a design variable, which can be increased and/or decreased as needed to achieve the desired level of sensitivity.

FIG. 3 illustrates similar steps, where less than the specified percentage of blocks 115 have been modified. As with the embodiment illustrated in FIG. 2, the modification analysis manager 111 compares 201, for each identified block 115, content at the location of the block 115 after the executable file 101 has been modified with the content of the block 115 prior to the modification. The modification analysis manager 111 determines 301 that the modification was malicious, responsive to less than a specified percentage of the blocks 115 having been modified.

FIG. 4 illustrates steps for performing an embodiment in which the modification status is determined based on at least one additional factor, in addition to the percentage of blocks 115 that have been modified. Recall that certain modifications are characteristic of a malicious modification. In some embodiments, where less than a specified percentage of blocks 115 have been modified, the modification analysis manager 111 checks for such additional factors in order to determine the status.

As illustrated in FIG. 4, the modification analysis manager 111 compares 201, for each identified block 115, content at the location of the block 115 after the executable file 101 has been modified with the content of the block 115 prior to the modification. The modification analysis manager 111 then reads 401 the modified executable file 101 in order to check for at least one additional factor concerning the status of the modification. The additional factor(s) comprise edits to the executable file 101 that are characteristic of a malicious modification. Examples of additional factors are the modification of an entry point 105 of the executable file 111, the appending of content to the executable file 111 and the granting of execute privileges to a section of the executable file 101 other than the code section 107, such as the data section 109. It will be readily apparent to one of ordinary skill in the art that the modification analysis manager 111 can check for other additional factors, as desired.

The modification analysis manager 111 then determines 403 that the modification of the executable file 111 comprises a malicious modification, responsive to less than a specified percentage of the blocks 115 having been modified, and to the detection of at least one additional factor concerning the status of the modification. In different embodiments the modification analysis manager 111 can require that specific ones or combinations of additional factors be present in order to indicate that the modification was malicious.

Figure 5:
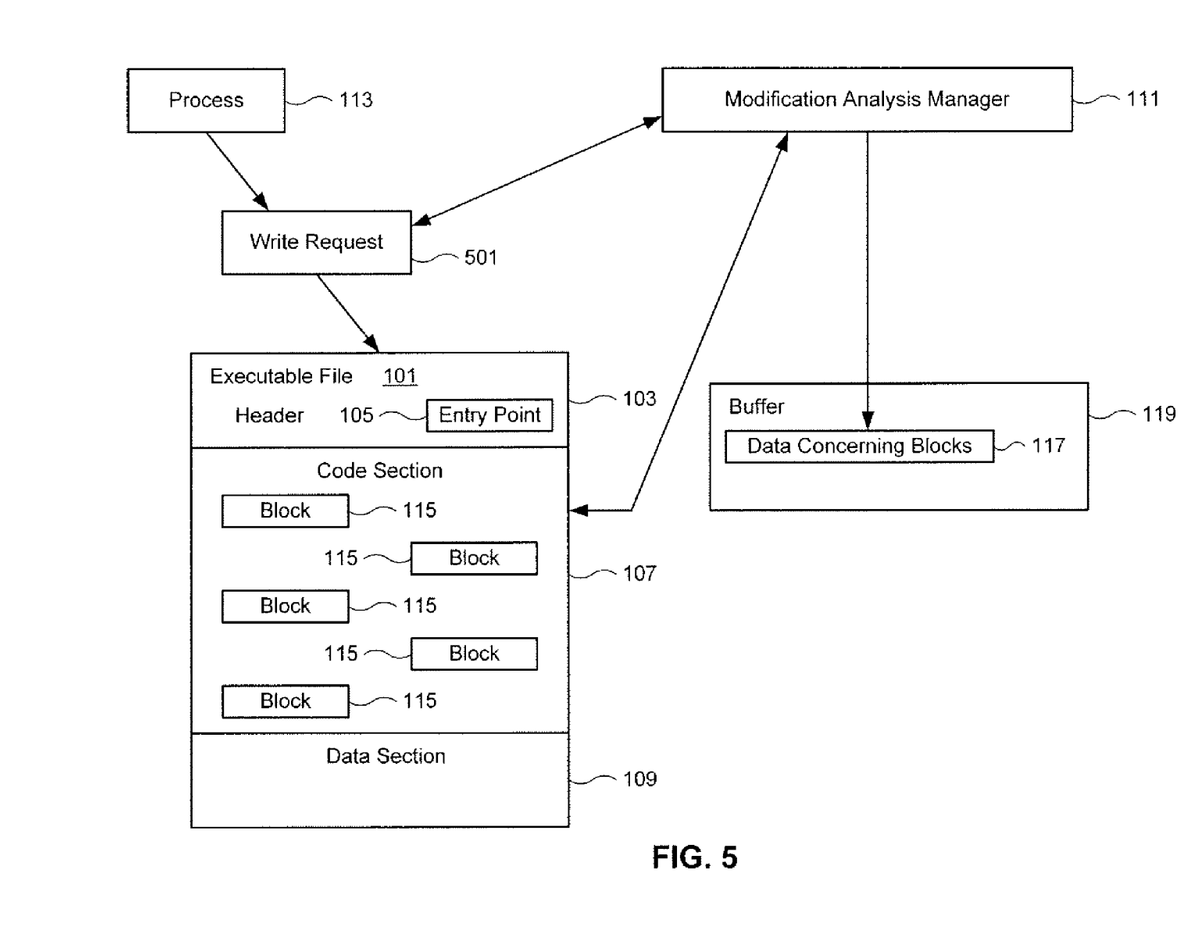
FIG. 5 is a block diagram illustrating an overview of one embodiment of the present invention in which the modification analysis manager intercepts requests to write to executable files.

FIG. 5 illustrates an overview of an embodiment of the present invention in which the modification analysis manager 111 intercepts requests 501 to write to executable files 101, in order to examine the executable files 101 before and after modification to determine the modification status. As illustrated in FIG. 5, the modification analysis manager 111 intercepts requests 501 to write to executable files 101. The implementation details of intercepting write requests 501 are known to those of ordinary skill in the relevant art. Prior to the execution of an intercepted write request 501, the modification analysis manager 111 identifies and stores the blocks 115, according to one of the various embodiments described above. Thus, the modification analysis manager identifies and stores blocks 115 before the file is modified by the write request 501. The modification analysis manager 111 then allows execution of the write request 501, thereby allowing the modification of the executable file 111. After execution of the write request 501, the modification analysis manager 111 compares the blocks 115 and determines the modification status, according to one of the above described embodiments.

Figure 6:
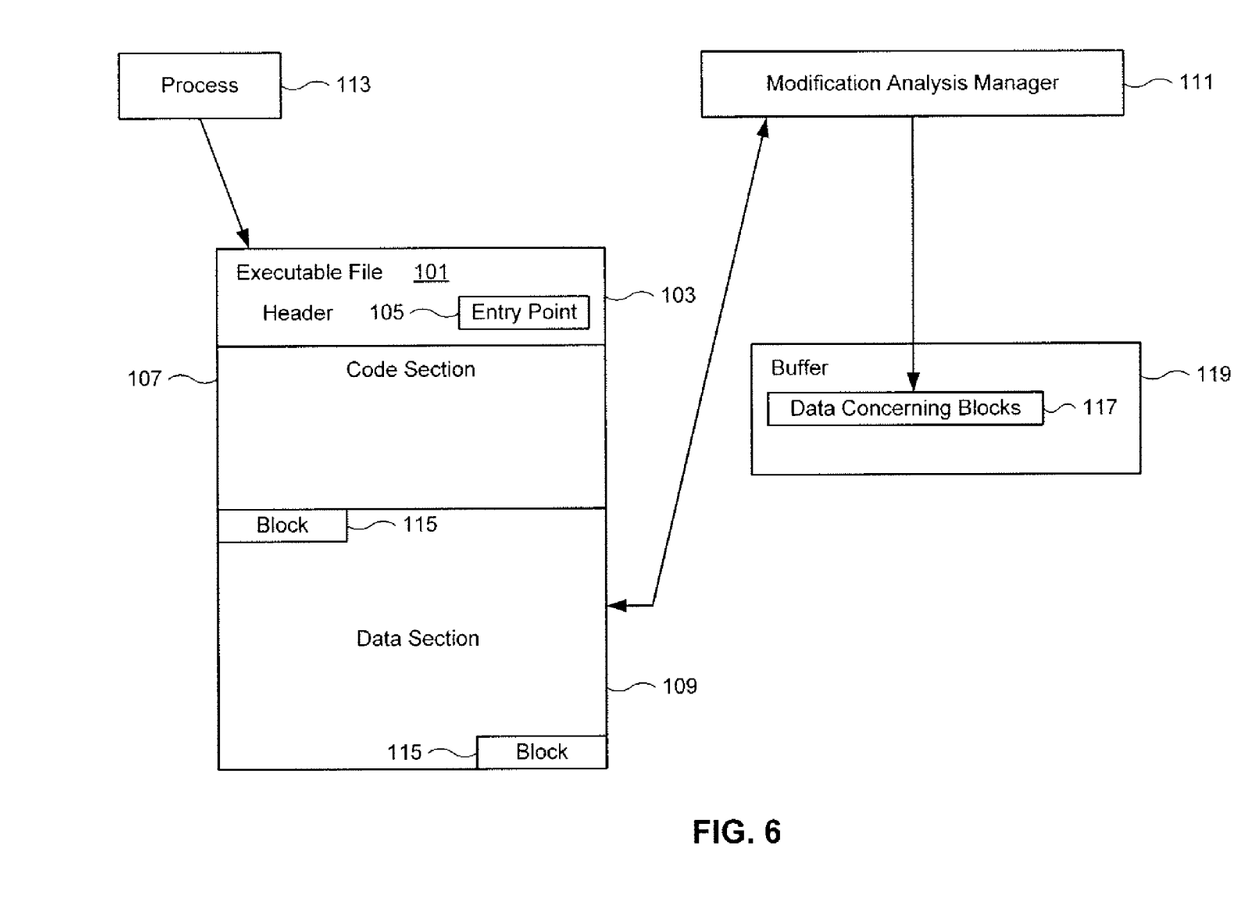
FIG. 6 is a block diagram illustrating a high level overview of another embodiment of the present invention.

FIG. 6 is illustrates a high level overview of another embodiment of the present invention. In the embodiment illustrated in FIG. 6, the modification analysis manager 111 examines the data section 109 of the executable file 101 before and after a process 113 modifies the executable file 101. Recall that certain types of data section 109 modifications can be characteristic of legitimate modifications of an executable file 101. Therefore, in some embodiments of the present invention, the modification analysis manager 111 examines modifications to the data section 109 to determine the status of a modification to an executable file 101.

As with the embodiment illustrated in FIG. 1, an executable file 101 has a header 103 with an entry point 105, a code section 107 and a data section 109. Prior to the process 113 of modifying the executable file 101, the modification analysis manager 111 stores data 117 concerning a specified number of specified sized blocks 115 of contiguous content from the data section 109. For example, the modification analysis manager 111 can store data 117 concerning blocks in a buffer 119 as illustrated. As with the embodiment illustrated in FIG. 1, the specified number of blocks 115 and the specified size of a block 115 are design variables.

In some embodiments, the modification analysis manager 111 stores data 117 concerning a block 115 at the beginning of the data section 109 and a block 115 at the end of the data section 109. In other embodiments, the modification analysis manager 111 can store data 117 concerning a single block 115, more than two blocks 115, and/or block(s) at other locations, as desired. The stored data 117 generally comprises at least the location of the block 115 and content-specific information concerning the block 115. Where the location of a block is fixed (e.g., in an embodiment in which the modification analysis manager 111 always stores data 117 concerning a block 115 located at the beginning of the data section 109), it is not necessary to store the location of that block 115. In some embodiments, the location of a block 115 comprises an offset from the beginning of the data section 109.

In some embodiments, the modification analysis manager 111 computes a hash value of the block 115, and stores the hash value. In other embodiments, the modification analysis manager 111 stores the actual content of the block 115.

After the modification of the executable file 101, the modification analysis manager 111 compares, for each stored block 115, the content at the location of the block 115 after the modification of the executable file 101 with the content of the block 115 prior to the modification of the executable file 101. In embodiments where the modification analysis manager 111 computes and stores a hash value of the block 115 prior to the modification of the executable file, the modification analysis manager 111 also computes a hash value of the content at the location of the block 115 after the modification, and compares the two hash values. In those embodiments in which the modification analysis manager 111 stores the actual content of the block 115, the modification analysis manager 111 compares the actual content at the location of the block 115 after the modification of the executable file 111 with the stored content of the block 115.

Figure 7:
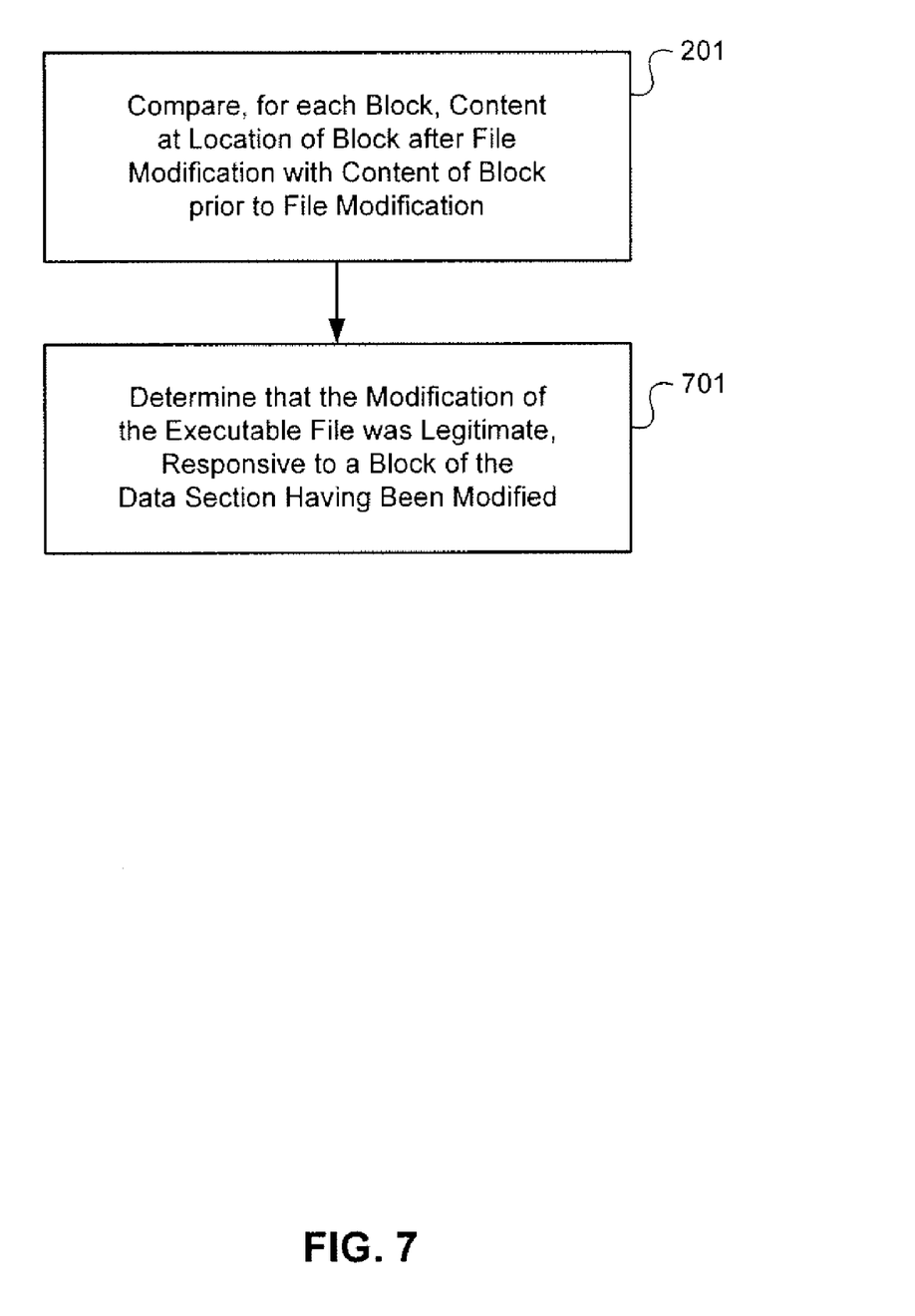
FIG. 7 is a flowchart illustrating steps for determining the status of a modification, according to another embodiment of the present invention.
Figure 8:
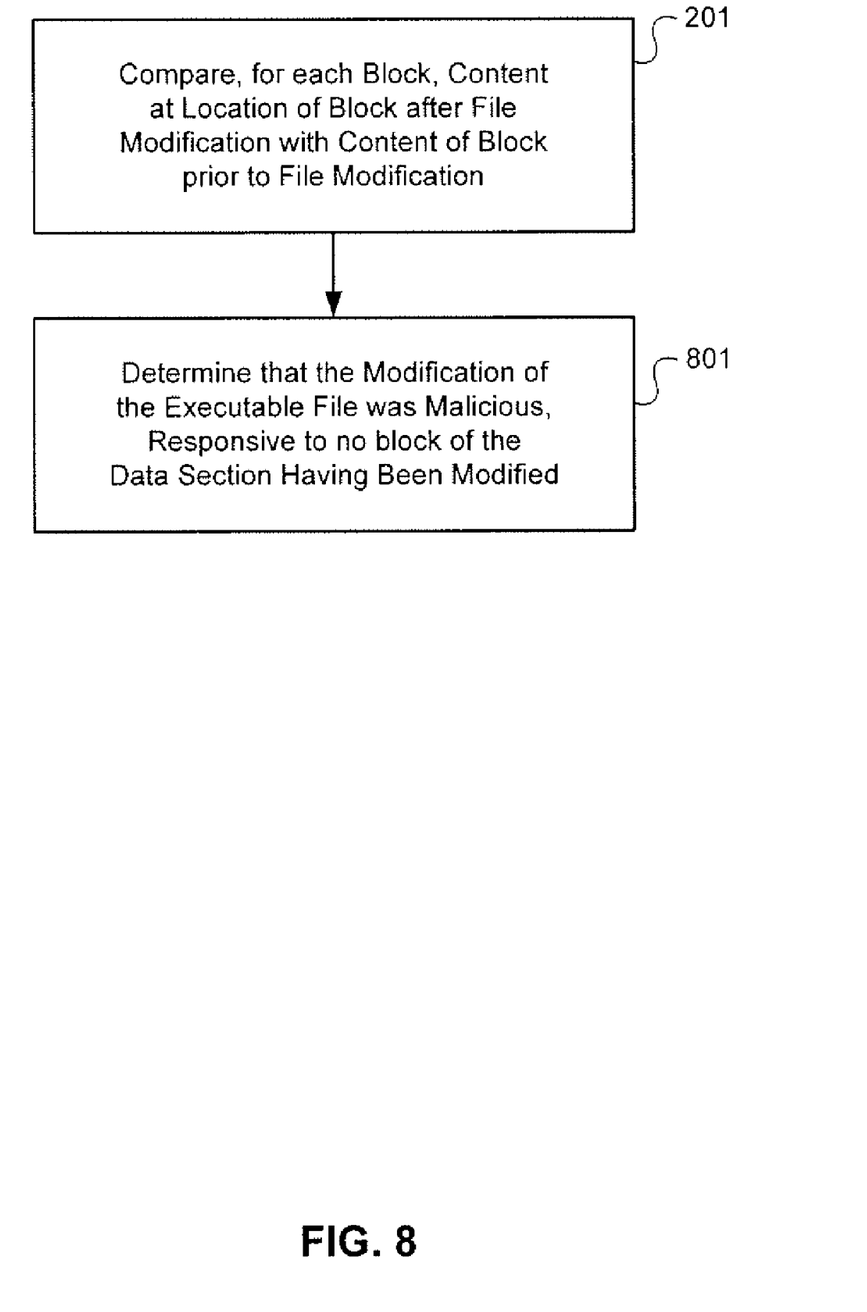
FIG. 8 is a flowchart illustrating steps for determining the status of a modification, according to another embodiment of the present invention.

The modification analysis manager 111 proceeds to utilize characteristics of legitimate and/or malicious modifications to determine whether the modification was legitimate or malicious based on the results of the comparison. FIGS. 7-8 illustrate steps for determining the status of an executable file 101 modification, according to different embodiments of the present invention. As illustrated by FIG. 7, in one embodiment the modification analysis manager 111 compares 201, for each identified block 115, content at the location of the block 115 after the executable file 101 has been modified with the content of the block 115 prior to the modification. Responsive to a block 115 of the data section 109 having been modified, the modification analysis manager 111 determines 701 that the modification was legitimate. Recall that legitimate modifications often edit a program's data, causing a significant change to the content within the data section 109, whereas a malicious modification will typically not result in such a change. Therefore, by determining that a specified sized block 115 of contiguous content from the data section 109 has been modified, the modification analysis manager 111 can determine 701 that the modification was legitimate.

FIG. 8 illustrates similar steps, where no block 115 of the data section 109 was modified. As with the embodiment illustrated in FIG. 7, the modification analysis manager 111 compares 201, for each identified block 115, content at the location of the block 115 after the executable file 101 has been modified with the content of the block 115 prior to the modification. The modification analysis manager 111 determines 801 that the modification was malicious, responsive to no block 115 of the data section 109 having been modified.

Figure 9:
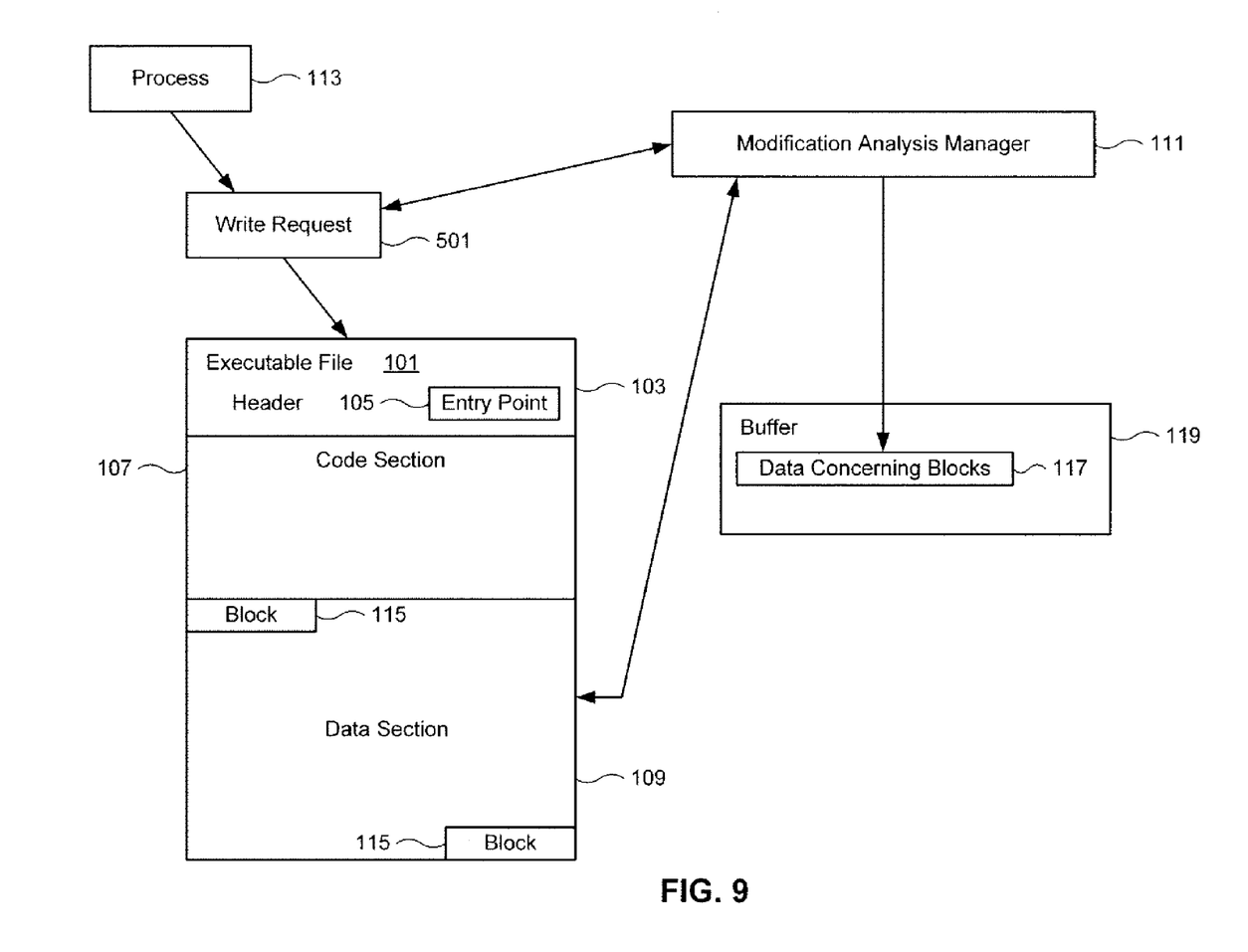
FIG. 9 is a block diagram illustrating an overview of another embodiment of the present invention in which the modification analysis manager intercepts requests to write to executable files.

FIG. 9 illustrates an overview of an embodiment of the present invention in which the modification analysis manager 111 intercepts requests 501 to write to executable files 101, in order to examine the executable files 101 before and after modification to determine the modification status. The embodiment illustrated in FIG. 9 is similar to the one illustrated in FIG. 5, except that in the embodiment illustrated in FIG. 9, the modification analysis manager 111 compares blocks 115 of the data section 109.

As illustrated in FIG. 9, the modification analysis manager 111 intercepts requests 501 to write to executable files 101. Prior to the execution of an intercepted write request 501, the modification analysis manager 111 stores block(s) 115 of the data section 109, as described above. The modification analysis manager 111 then allows execution of the write request 501, thereby allowing the modification of the executable file 111. After execution of the write request 501, the modification analysis manager 111 compares the blocks 115 and determines the modification status, according to one of the above described embodiments.

Figure 10:
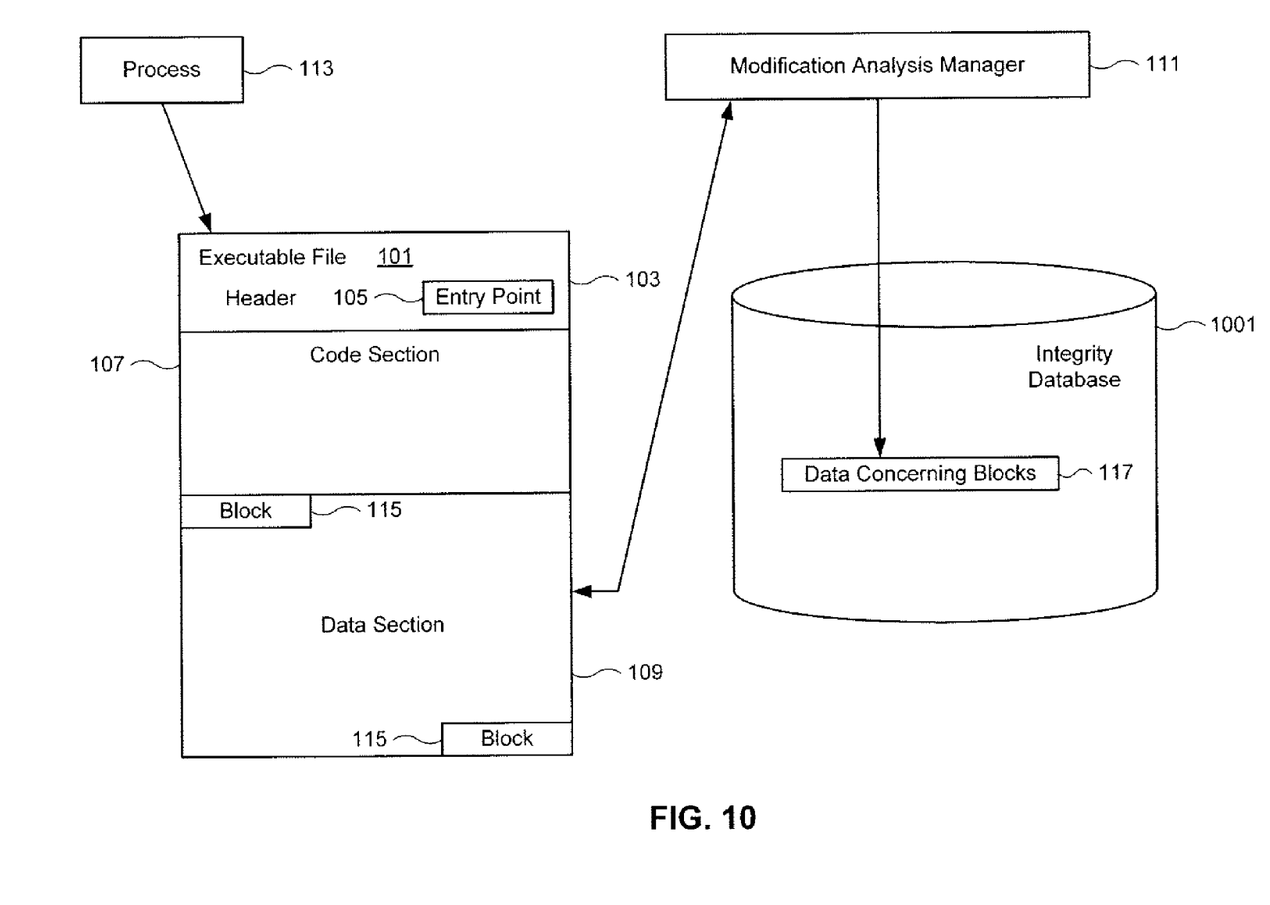
FIG. 10 is a block diagram illustrating an embodiment of the present invention in which data concerning blocks is stored in an integrity database.

FIG. 10 illustrates an embodiment of the present invention in which data 117 concerning blocks 115 is stored in an integrity database 1001. Prior to the modification of an executable file 101, the modification analysis manager 111 stores data 117 concerning identified blocks. 115 (e.g., location and content information) in an integrity database 1001. After modification of an executable file 101, the modification analysis manager 111 then reads the stored data 117 from the integrity database 1001 in order to determine the modification status as described above. It will be readily apparent to one of ordinary skill in the relevant art that the integrity database 1001 can be updated whenever an executable file 101 is modified, and subsequently accessed whenever it is desirable to determine the status of the modification. Although FIG. 10 illustrate an embodiment in which the modification analysis manager ill processes block(s) 115 of the data section 109, it will be readily apparent to one of ordinary skill in the relevant art that an integrity database 1001 can also be utilized with embodiments of the present invention in which the modification analysis manager 111 processes block(s) 115 of the code section 107.

It will be further apparent to those of ordinary skill in the relevant art that additional embodiments are within the scope of the present invention, in which the modification analysis manager 111 processes block(s) 115 of the other sections of executable files 101, such as resource sections or relocation items. The size and number of the blocks compared, as well as the nature of any additional factors examined, are functions of the characteristics associated with legitimate and/or malicious modifications of the sections being examined.

Figure 11:
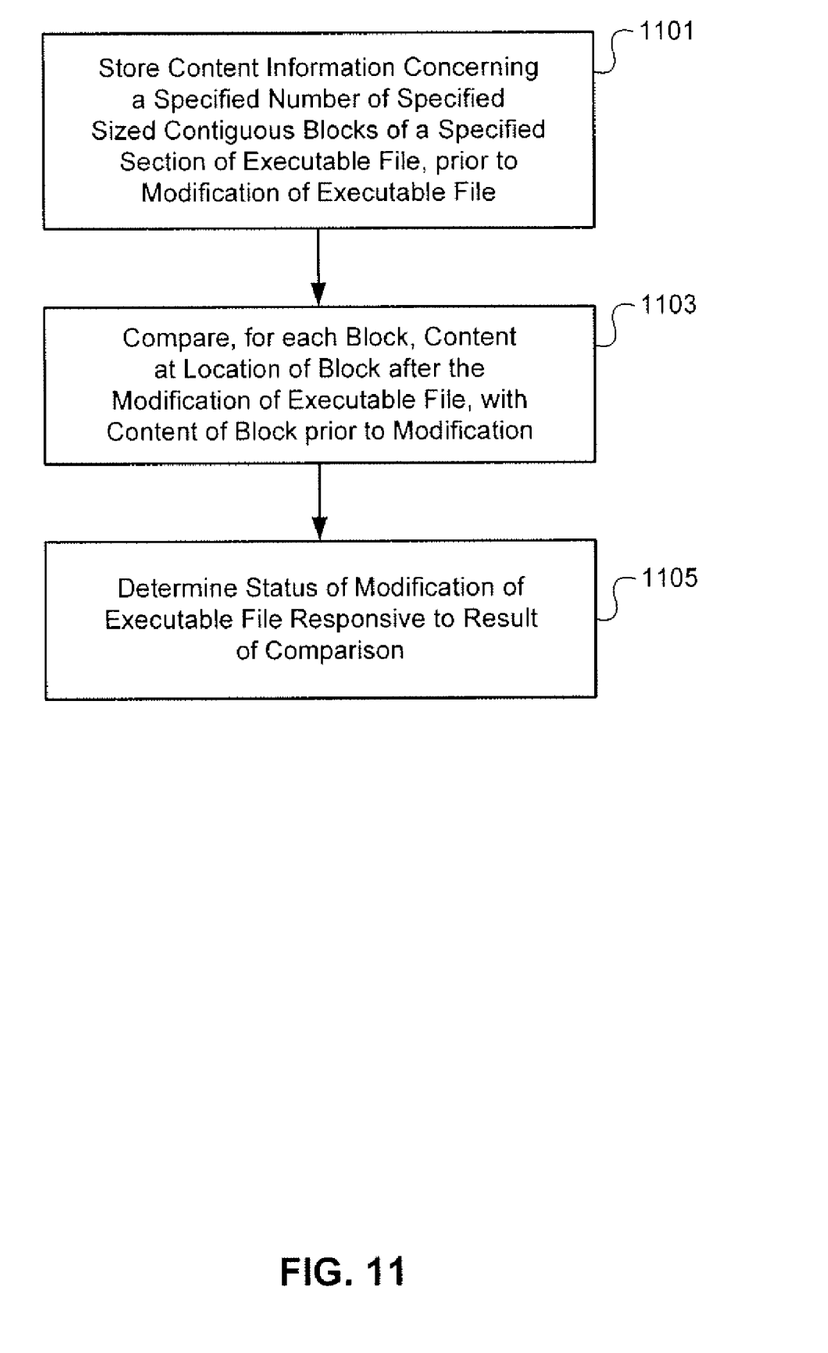
FIG. 11 is a flowchart illustrating steps for distinguishing legitimate modifications to executable files from malicious modifications to executable files, according to some embodiments of the present invention.

FIG. 11 illustrates high level methodology that can be used in such embodiments. Prior to a modification of the executable file, the modification analysis manager 111 stores 1101 content information concerning a specified number of specified sized blocks 115 of contiguous content from a specified section of the executable file 101. After the modification of the executable file 101, the modification analysis manager 111 compares 1103, for each block 115, the content at the location of the block 115 after the modification of the executable file 101 with the content of the block 115 prior to the modification of the executable file 101. The modification analysis manager 111 then determines 1105 the status of the modification of the executable file 101, responsive to the result of the comparison.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for distinguishing between a legitimate modification and a malicious modification of executable computer file, the method comprising the steps of:
   prior to a modification of an executable file:
      a modification analysis manager identifying a specified number of blocks of a specified size of contiguous substantive content from a specified section of the executable file; and
      the modification analysis manager storing, for each identified block, a location of the block, and content-specific information concerning the block; and
   after the modification of the executable file:
      the modification analysis manager comparing, for each identified block, content at the location of the block after the modification of the executable file with content of the block prior to the modification of the executable file; and
      the modification analysis manager determining a status of the modification of the executable file responsive to a result of the comparison and, responsive to determining that greater than a specified threshold percentage of the blocks has been modified, determining that the modification of the executable file comprises a legitimate modification.

2. The method of claim 1 wherein identifying a specified number of blocks of a specified size of contiguous substantive content from a specified section of the executable file further comprises:
   the modification analysis manager scanning the specified section from end to beginning for blocks of a specified size of contiguous substantive content.

3. The method of claim 1 wherein storing the location of a block further comprises:
   the modification analysis manager storing an offset of the block from the beginning of the specified section.

4. The method of claim 1 wherein storing content-specific information concerning a block further comprises:
   the modification analysis manager computing a hash value of the content of the block; and
   the modification analysis manager storing the hash value.

5. The method of claim 4 wherein comparing content at the location of the block after the modification of the executable file with content of the block prior to the modification of the executable file comprises:
   the modification analysis manager computing a hash value of the content at the location of the block after the modification of the executable file; and
   the modification analysis manager comparing the hash value of the content at the location of the block after the modification of the executable file with the stored hash value of the content of the block prior to the modification of the executable file.

6. The method of claim 1 wherein storing content-specific information concerning a block comprises:
   the modification analysis manager storing the content of the block.

7. The method of claim 6 wherein comparing content at the location of the block after the modification of the executable file with content of the block prior to the modification of the executable file comprises:

the modification analysis manager comparing the content at the location of the block after the modification of the executable file with the stored content of the block.

8. The method of claim 1 further comprising:
the modification analysis manager reading the modified executable file in order to check for at least one additional factor concerning the status of the modification.

9. The method of claim 1 further comprising:
the modification analysis manager intercepting a request to write to the executable file;
prior to execution of the request to write to the executable file, the modification analysis manager performing the identifying and storing steps;
the modification analysis manager allowing execution of the request to write to the executable file; and
after execution of the request to write to the executable file, the modification analysis manager performing the comparing and determining steps.

10. The method of claim 1 further comprising:
prior to the modification of the executable file, the modification analysis manager storing the location and content information in an integrity database; and
after the modification of the executable file, the modification analysis manager reading the stored information from the integrity database.

11. A computer implemented method for distinguishing between a legitimate modification and a malicious modification of an executable computer file that comprises at least two data sections, by analyzing a first data section of the executable computer file, the method comprising the steps of: prior to a modification of the executable file: a modification analysis manager storing content information concerning a specific number of blocks of a specified size of contiguous content from the first data section wherein the modification analysis manager stores content information concerning a first block of a specified size that starts at the beginning of the first data section, and stores the location of and content information concerning a second block of a specified size that terminates at the end of the first data section; and after the modification of the executable file: the modification analysis manager comparing, for each block, content at the location of the block after the modification of the executable file with content of the block prior to the modification of the executable file; and responsive to no block of the first data section having been modified, the modification analysis manager determining that the modification of the executable file comprises a malicious modification.

12. The method of claim 11 wherein storing the location of the second block comprises:
the modification analysis manager storing an offset of the second block.

13. The method of claim 11 wherein storing content-information concerning a block of the specified number of blocks of a specified size comprises:
the modification analysis manager computing a hash value of the content of the block; and
the modification analysis manager storing the hash value.

14. The method of claim 13 wherein comparing content at the location of the block after the modification of the executable file with content of the block prior to the modification of the executable file comprises:

the modification analysis manager computing a hash value of the content at the location of the block after the modification of the executable file; and
the modification analysis comparing the hash value of the content at the location of the block after the modification of the executable file with the stored hash value of the content of the block prior to the modification of the executable file.

15. The method of claim 11 wherein storing content-specific information concerning a block of the specified number of blocks of a specified size comprises:
the modification analysis manager storing the content of the block.

16. The method of claim 15 wherein comparing content at the location of the block after the modification of the executable file with content of the block prior to the modification of the executable file comprises:
the modification analysis manager comparing the content at the location of the block after the modification of the executable file with the stored content of the block.

17. The method of claim 11 further comprising:
the modification analysis manager intercepting a request to write to the executable file;
prior to execution of the request to write to the executable file, the modification analysis manager performing the storing step;
the modification analysis manager allowing execution of the request to write to the executable file; and
after execution of the request to write to the executable file, the modification analysis manager performing the comparing and determining steps.

18. The method of claim 11 further comprising:
prior to the modification of the executable file, the modification analysis manager storing the location and content information in an integrity database; and
after the modification of the executable file, the modification analysis manager reading the stored information from the integrity database.

19. A computer readable medium containing a computer program product for distinguishing between a legitimate modification and a malicious modification of a code section of an executable computer file, the computer program product comprising:
program code for identifying a specified number of blocks of a specified size of contiguous substantive content from a specified section of an executable file, prior to a modification of the executable file;
program code for storing, for each identified block, a location of the block, and content-specific information concerning the block, prior to the modification of the executable file;
program code for, after the modification of the executable file, comparing, for each identified block, content at the location of the block after the modification of the executable file with content of the block prior to the modification of the executable file; and
program code for determining a status of the modification of the executable file responsive to a result of the comparison, after the modification of the executable file and for, responsive to determining that greater than a specified threshold percentage of the blocks has been modified, determining that the modification of the executable file comprises a legitimate modification.

20. The computer program product of claim 19 further comprising:

program code for scanning the specified section from end to beginning for blocks of a specified size of contiguous substantive content.

21. A computer readable medium containing a computer program product for distinguishing between a legitimate modification and a malicious modification of an executable computer file that comprises at least two data sections by analyzing a first data section of an executable computer file, the computer program product comprising: program code for storing content information concerning a specified number of blocks of a specified size of contiguous content from the first data section, and for storing content information concerning a first block of a specified size that starts at the beginning of the first data section, and for storing the location of and content information concerning a second block of a specified size that terminates at the end of the first data section, prior to a modification of an executable file; program code for, after the modification of the executable file, comparing, for each block, content at the location of the block after the modification of the executable file with content of the block prior to the modification of the executable file; and program code for, responsive to no block of the first data section having been modified, the modification analysis manager determining that the modification of the executable file comprises a malicious modification.

22. The computer program product of claim 21 further comprising program code for storing an offset of the first block.

23. A computer system for distinguishing between a legitimate modification and a malicious modification of an executable computer file that comprises at least two data sections by analyzing a first data section of the executable computer file, the computer system comprising: a storage module storing content information concerning a specified number of blocks of a specified size of contiguous content from the data section wherein the storage module stores content information concerning a first block of a specified size that starts at the beginning of the first data section, and stores the location of and content information concerning a second block of a specified size that terminates at the end of the first data section, prior to a modification of an executable file; a comparison module comparing, for each block, after the modification of the executable file, content at the location of the block after the modification of the executable file, the comparison module being communicatively coupled to the storage module; and a determination module determining that the modification of the executable file comprises a malicious modification, responsive to no block of the first data section having been modified, the determination module being communicatively coupled to the comparison module.

24. The computer system of claim 23 wherein:
the storage module is further adapted to store an offset of the first block.

* * * * *